Aug. 26, 1969 SHOICHI MIYASHIRO 3,463,879
IMAGE TRANSMITTING SYSTEM UTILIZING ONE TUBE FOR DISPLAY AND TRANSMISSION OF IMAGES
Filed April 15, 1966
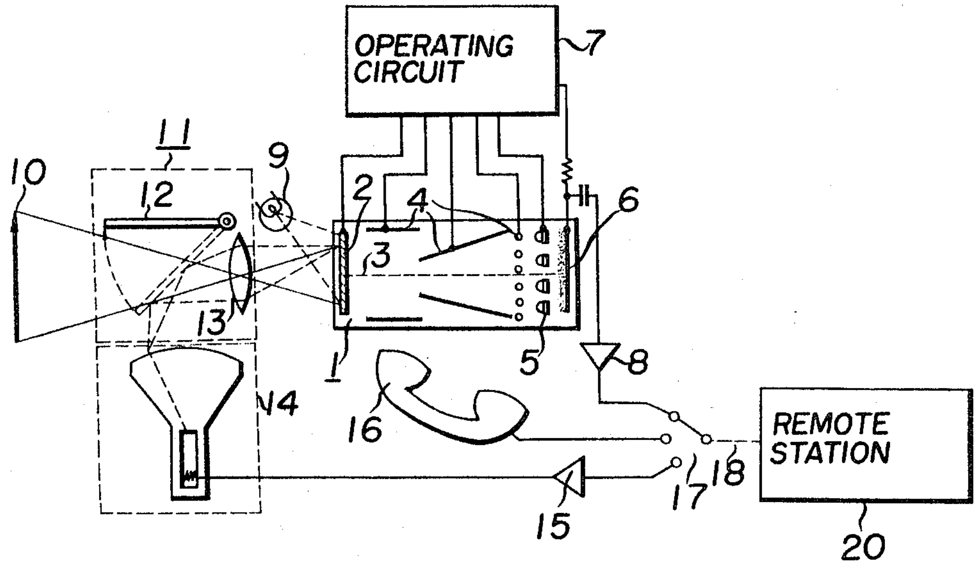
SHOICHI MIYASHIRO,
INVENTOR.
BY Stephen H. Friskauf
Atty United States Patent Office 3,463,879
Patented Aug. 26, 1969

3,463,879
IMAGE TRANSMITTING SYSTEM UTILIZING ONE TUBE FOR DISPLAY AND TRANSMISSION OF IMAGES

Shoichi Miyashiro, Yokohama-shi, Japan, assignor to Tokyo Shibaura Electric Co., Ltd., Kawasaki-shi, Japan, a corporation of Japan Filed Apr. 15, 1966, Ser. No. 542,846
Claims priority, application Japan, Apr. 19, 1965, 40/22,735
Int. Cl. H04n 7/04, 7/14
U.S. Cl. 178—6.8 6 Claims

ABSTRACT OF THE DISCLOSURE

A direct viewing type photoelectric storage tube, into which a fluorescent surface is incorporated, provides a display and image transmitter for use with slow speed scanning; an optical system projects a light image of an object onto the storage tube, a flying spot scanner provides a scanning current for the photoelectric surface of the tube, and a flood light source is provided for further illuminating the photoelectric surface of the storage tube so that images may be displayed on the fluorescent surface. A changeover switch may be provided for converting the image transmission system to an image reception system.

This invention relates to an image transmitting system utilized in television and the like, and more particularly to an image transmission system which is especially useful for such a case wherein only slow speed scanning is permissible in transmission systems of narrow band width, for example, the so-called television telephone.

In prior art picture image transmitting and receiving systems represented by television systems, as is well known in the art, each picture image is decomposed into a plurality of picture elements, say for example, about 300,000 elements, the picture elements are sequentially converted into a series of electric signals by means of a photoelectric conversion to produce image signals at a rate of scores of frames per second, the image signals are transmitted over a transmission system having a band width of several megacycles per second. On the receiving end, received image signals are reproduced by sequentially combining received image signals to display continuous images free of flicker by utilizing the after-image effect of human eyes.

Under restricted conditions for these systems, for example, where it is desirable to transmit picture images by conventional telephone lines, as the band width of the transmitting system is only about several kilocycles per second so that it is necessary to limit the number of picture images which are transmitted per second in order to maintain the resolution of the picture image at a high value. In other words, it is obliged to use the so-called slow speed scanning which requires substantial time to transmit and receive each picture. Considering the operation on the transmitting side in such a case, since the photoelectric conversion is effected by exposing the picture or object for a long time the reproduced images will be obscure or distorted whereas on the receiving side, in the extreme case, a light spot will move successively across a screen so that it is difficult to observe it as a picture by the after-image effect of eyes.

In order to eliminate difficulties mentioned above encountered in the slow scanning television system it is necessary to provide sufficiently large image storage ability for an image pickup as well as receiving devices.

In a prior approach for eliminating the above mentioned difficulty occurring on the image transmitting side the storage ability of vidicon image pickup tubes was relied upon. Where more perfect solution was desired use was made of a combination of a vidicon tube of rapid scanning type and a signal conversion type storage tube serving to convert said rapid scanning into slow speed scanning. However, both of them are disadvantageous in that either their characteristics are not satisfactory or the apparatus is complicated and expensive.

It is an object of this invention to eliminate above mentioned prior disadvantages whereby to provide an improved image transmitting system which is simple yet of excellent characteristics.

Another object of this invention is to provide a novel transmitting system characterized in that it can readily receive images by the addition of some auxiliary devices, if desired.

Further objects of this invention is to provide a novel image transmitting system useful for the reception of picture images over a transmission path of narrow band width.

Still further objects of this invention is to provide an image transmitting system suitable for use in video telephones.

The invention will be better understood from the following description taken in connection with the accompanying drawing in which a single drawing shows a schematic circuit arrangement of a video telephone device embodying the image transmitting system according to this invention and which can also be used to receive image by providing necessary auxiliary devices.

Referring now to the accompanying drawing this invention is shown as applied to a transmitting and receiving system which can operate either to transmit and receive picture image or to speak by switching the circuit. The system shown comprises a direct viewing type photoelectric storage tube 1, an operating circuit 7, an optical system 11, a flying spot device 14, a telephone set 16 and their auxiliaries.

The image transmitting system, the subject matter of this invention, will firstly be considered. A light image or object 10 which is to be transmitted to a remote station 20 is focussed on a photoelectric surface 2 of a direct viewing type photoelectric storage tube 1 via a suitable optical system 11 to produce a photoelectric current 3 from the photoelectric surface 2 corresponding to the light image 10. This image photoelectric current is concentrated into a beam by means of an accelerating and focussing electrode 4 and the like and then the beam is caused to focus and impinge upon a mesh-shaped storage target 5 by the electronic optical action. If the potential on the storage target 5 were brought to a suitable value by a well known method prior to the impingement of the beam and electrostatic image corresponding to the brightness of the light image 10 would be stored on the storage target 5 for a definite time interval. Since the light image is moving in one case or is very brilliant in the other case, is advantageous to make an exposure of the desired time by providing a mechanical shutter for the optical system 11 or an electronic means, such as a shutter grid, in the direct viewing type photoelectric storage tube. In some cases, the intensity of illumination for the light image 10 may be increased momentarily with equal result at the time of exposure.

Then, a flying spot device 14 serving to scan the light spot is operated so as to cause a light spot of a definite brightness to scan the photoelectric surface 4 of the direct viewing type photoelectric storage tube 1 through the optical system 11. In this manner, photoelectrons will be successively emitted from the respective points on the photoelectric surface which are then accelerated and focussed to scan the storage target. Incoming photoelectrons will transmit through various points of the storage target at different rates dependent upon the potential image distributed on the storage target. Stated in another way, the photoelectron current transmitted through the sorage target is modulated by the image signal. As shown in the drawing, the photoelectron current may be collected by a fluorescent screen electrode 6 and then sent out as the image signal. In reading out the stored image signal, with a transmitting system of slow speed scanning, such as a video telephone wherein one picture frame may be sent during a relatively long interval, say for example 5 seconds, owing to the large charge preserving power of the target, the image signals can be successively sent out without any trouble to the remote station.

By applying a suitable high voltage on the fluorescent screen while the images are transmitted concurrently with transmission of image signals by means of the readout scanning photoelectrons, reproduction on the images on the sending side is also possible. In the case of slow speed scanning, however, the only result is to merely view successive movements of the light spot on the screen. In such a case, it is advantageous to illuminate the entire surface of the photoelectric surface with uniform light rays coming from a flood light source 9 to superpose upon the flying spot, whereby to emit flood light electrons to impinge upon the storage target thus reproducing the entire picture image or monitoring the image on the transmitting side. In this case, there will be no trouble experienced because the output currently from the tube merely includes superposed direct current component caused by the flood photoelectron current and because the image signal current can be readily separated. While in the drawing, the output signal is shown as being derived out directly from the electrode of the photoelectric storage tube 1, it is to be understood that the image signals can also be obtained by suitably detecting and amplifying by means of a detector, such as a photoelectric tube, luminescences produced by the collision of the scanning electric current against the fluorescent screen. Monitoring of the transmitted images on the transmission side may be done concurrently with the transmission thereof, as described hereinbefore. Monitoring of the image without transmitting thereof can be made by floodlighting with flooding light source whereby to reproduce all area of the picture image. Alternatively, in order to effect monitoring, the flying spot device which functions to effect slow speed scanning at the time of transmission may be switched to rapid scanning or may be modified to emit the flood light by itself to illuminate the photoelectric surface of the photoelectric storage tube 1.

It will thus be clear that the novel system permits satisfactory pick up of the image as well as transmission thereof to the remote station 20 via a suitable amplifier 8 and an image transmission circuit 18.

Another feature of this invention lies in that the transmission system can also be employed as the image receiving device, if desired.

One example thereof is given hereunder. Image signals transmitted from the remote station 20 are applied to the flying spot device 14 via a change-over switch 17 and an amplifier 15 to successively modulate the light quantity emitted therefrom and then cause the modulated light to project upon the photoelectric surface 2 of the direct viewing type photoelectric storage tube 1 via a mirror 12 which is moved to reflect the light. Image photoelectric currents thus obtained are caused to successively impinge upon the storage target thus forming thereon the electrostatic image corresponding to the image at the remote station after any desired time. Thereafter, by means of a suitable means similar to that utilized during transmission of the image, flooded light rays are projected upon the photoelectric surface 2 to generate the flood photoelectric current which is modulated in accordance with the stored electrostatic image corresponding to the image in the remote station and thereafter accelerated to continuously reproduce the original image on the fluorescent screen for any desired interval of time.

While above descriptions are directed to some of basic operations of the system embodying the principle of this invention it will be obvious to those skilled in the art that various communication systems may be devised by suitably combining them. For example, as illustrated in Table I both image reproduction and speech can be made in a predetermined sequence through a single telephone channel.

TABLE I

| A | B | |
|---|---|---|
| (1) Erasing.<br>(2) Preparation. | (5) Erasing.<br>(6) Preparation.<br>(7) Writing. | About 0.3 sec. |
| (3) Reception. | (8) Transmission. | About 0.3 sec. |
| (4) Reproduction of remote image speech. | (9) Reproduction of the image on the transmitting side speech. | May be of any seconds. |

Table I illustrates a manner of using a video telephone by Mr. A and Mr. B wherein the steps of communication with regard to elapse of time are shown starting from the top to the bottom of the table. During the steps 3 and 8 wherein pictures are transmitted from Mr. B to Mr. A the channel is occupied by image signals but thereafter they can talk with each other while looking other's face for any desired interval of time. Of course, it is also possible to reverse the above steps 3 and 8 as to be able to transmit a picture from Mr. A to Mr. B. When a signal is made, for instance by intercommunication of the speeches, at desired instant, a new cycle of transmitting and receiving pictures may be initiated.

As another example, suppose that, for example, Mr. A is possessed of an apparatus embodying this invention and that Mr. B an apparatus of different type. Even in such a case satisfactory communication may be had between them as far as common matters as the speed of image transmission, number of scanning lines, the synchronizing system etc. are operated according to a prescribed manner. It should also be understood that satisfactory result may be obtained by transmitting the image according to the novel system and by receiving the image by means of a system other than described above, for example, a storage type cathode ray tube.

While in the drawing the flying spot device is shown as comprising a cathode ray tube, this is only an example. It will be obvious that any suitable mechanical means such as a Nipkow's disc or a mirror wheel may be utilized.

In another modification, it is also possible to transmit images by the use of a simple storage tube wherein an electric conductive electrode surface is substituted for the fluorescent screen of said direct viewing type photoelectric storage tube 1.

In view of the above, it will be evident that many modifications and variations are possible in light of the above teachings. It therefore is to be understood that within the scope of the appended claims the invention may be practiced otherwise than as specifically described.

What I claim as new and desire to secure by Letters Patent of the United States is:

1. An image transmission system comprising:
an optical means (11) for projecting a light image of an object (10);
a flying spot device (14) for providing a scanning light beam;
a direct viewing type photoelectric storage tube (1);
means (12) for selectively causing said light image from said object or said scanning light beam to impinge said tube;
said direct viewing storage tube (1) including:
a photoelectric surface (2) to generate photoelectron currents (3) in response to said light image from said object (10);

a mesh type target (5) for storing an electrostatic image corresponding to said generated photoelectron currents (3); and a fluorescent surface (6) to emit light and display said object (10) responsive to electron current impinging thereon, said fluorescent surface (6) emitting light responsive to scanning electron currents generated by said photoelectric surface (2) in response to said scanning electron currents being transmitted through said target and modulated by said electrostatic images;

means for transmitting electrical signals corresponding to said modulated scanning electron currents to a remote station (20); and a flood light source (9) for illuminating said photoelectric surface (2) to cause flood electron currents to be produced so that the image corresponding to said electrostatic image stored on said target (5) is displayed on said fluorescent surface (6).

2. The system according to claim 1 further comprising:

a change-over switch (17) coupling said image transmission system to said remote station (20), for switching said system from an image transmitting system to an image reception system by coupling the output of said storage tube (1) to said remote station (20), or by coupling said flying spot means (14) to said remote station (20), respectively; and means (12) associated with said optical means (11) for causing the light output of said flying spot means (14), during reception from said remote station (20), to impinge upon the photoelectric surface (2) of said storage tube (1) to generate electrostatic images which are stored in said target (5), said flood light source (9) illuminating said tube (1) to display the light images sent by said remote station (20) on said fluorescent surface (6).

3. The image transmission system according to claim 1 wherein said electrical signals are slow speed scanning signals suitable for transmission paths of narrow band width.

4. The image transmission system according to claim 2 wherein said electrical signals are slow speed scanning signals suitable for transmission paths of narrow band width.

5. The image transmission system according to claim 3 wherein said transmission paths of narrow band width are telephone lines.

6. The image transmission system according to claim 4 wherein said transmission paths of narrow band width are telephone lines.

References Cited

UNITED STATES PATENTS

| | | | |
|---|---|---|---|
| 2,757,233 | 7/1956 | Webley | 178—6.8 |
| 2,929,869 | 3/1960 | Hines | 178—6.8 |
| 2,992,358 | 7/1961 | Farnsworth | 315—11 |

RALPH D. BLAKESLEE, Primary Examiner

J. A. ORSINO, Jr., Assistant Examiner

U.S. Cl. X.R.

313—65, 68; 315—11